(No Model.)
W. H. MERRITT.
FENCE WIRE CARRIER AND STRETCHER.
No. 518,672. Patented Apr. 24, 1894.
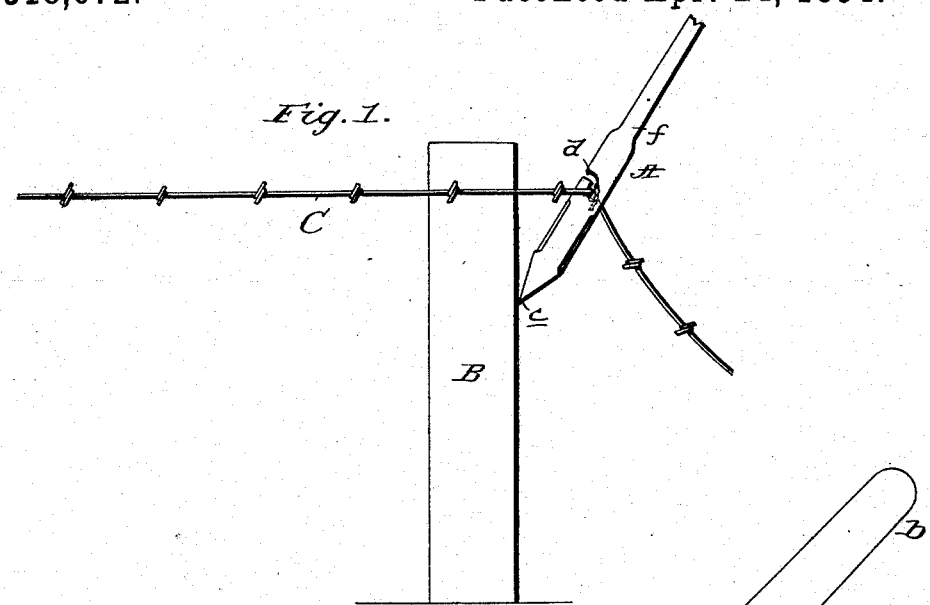
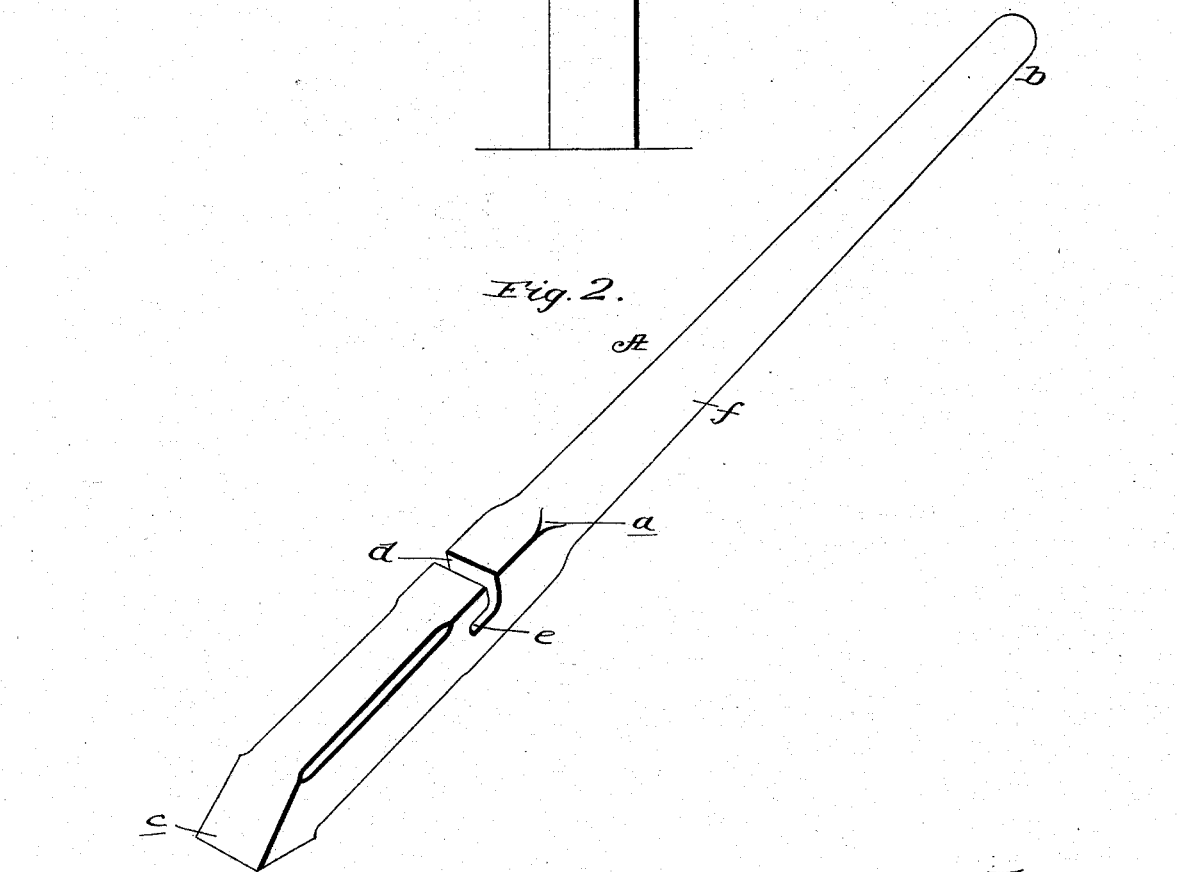

UNITED STATES PATENT OFFICE.

WILLIAM H. MERRITT, OF MINDEN, MICHIGAN.

FENCE-WIRE CARRIER AND STRETCHER.

SPECIFICATION forming part of Letters Patent No. 518,672, dated April 24, 1894.

Application filed February 23, 1893. Serial No. 463,515. (No model.)

*To all whom it may concern:*

Be it known that I, WILLIAM H. MERRITT, a citizen of the United States, residing at Minden, in the county of Sanilac and State of Michigan, have invented certain new and useful Improvements in Fence-Wire Carriers and Stretchers; and I do declare the following to be a full, clear, and exact description of the invention, such as will enable others skilled in the art to which it appertains to make and use the same.

This invention has relation to an improvement in compound tools or implements, and is particularly adapted for use in the construction of barbed wire fences, and the novelty will be fully understood from the following description and claim when taken in connection with the annexed drawings, in which—

Figure 1, is a view of a part of a fence, illustrating my improved implement as drawing a barbed wire to tighten the same, and Fig. 2, is a perspective view of the implement removed.

Referring by letter to said drawings: B, indicates a fence post, and C, a barb wire, both of which may be of the character and construction usually employed in barb wire fences. These devices form no part of my invention, but are here shown for the purpose of illustrating the application of my improved implement for tightening the wire.

A, indicates my improved implement. This implement is formed from iron, steel, or other suitable strong material, and comprises a bar of a sufficient length and thickness; being round in cross section for the greater portion of its length as shown, from the point *a*, to the end *b*. The opposite end of this bar is beveled on opposite sides so as to provide a chisel point *c*. From the chisel point to the point *a*, it is preferably of an angular form in cross section, and on one side of this angular portion, is a transverse entrance slot *d*, which opens into a central, longitudinal slot *e*, directed toward the chisel point as shown. The slot in the bar is designed to receive the wire of a fence, and when barbed wire is employed, the wire may be received in the slot, when the contacting barb will prevent such wire from being drawn through, when by placing the implement in the position shown in Fig. 1, with the beveled end against one side of the post, and drawing upon the opposite end of the lever, great leverage can be obtained, and barb wires effectively tightened. The bevel or chisel point will serve such useful purposes as crow bars are employed for, in addition to the function which it is here shown as performing. By reason of the round portion *f*, I am enabled to receive a spool of barbed wire upon it, when by having two men catch hold of opposite ends of the bar, such spool may be conveniently carried and allowed to reel off of the spool without injuring the hands. So I have an implement which can be used for every purpose of a crow bar, as well as a device for tightening barb wires upon a fence and carrying a spool of barb wire, at a slightly greater expense than the bare cost of a crowbar.

I am well aware that a compound implement of circular form in cross section having a chisel or beveled end and provided with a lug at an intermediate point in its length and a pivoted dog for binding a wire against said lug, is old. I am also aware that a slidable bar, forming part of a wire stretcher and having a transverse slot with an enlargement at its inner end is old, and I therefore make no claim to such constructions, but

What I claim, and desire to secure by Letters Patent, is—

The compound implement described, consisting essentially of the bar, having the angular portion provided with the chisel or beveled end *c* and the transverse slot *d*, and the communicating, longitudinal slot *e*, in said angular portion, and the portion *f*, round in cross section from the point *a*, to the end *b*, substantially as shown and described.

WILLIAM H. MERRITT.

Witnesses:
J. S. McLEON,
HUGH McALPIN.